United States Patent [19]
Kostrov

[11] Patent Number: 6,015,010
[45] Date of Patent: Jan. 18, 2000

[54] DUAL TUBING PUMP FOR STIMULATION OF OIL-BEARING FORMATIONS

[75] Inventor: Sergey A. Kostrov, Dallas, Tex.

[73] Assignee: Applied Seismic Research Corporation, Plano, Tex.

[21] Appl. No.: 08/927,032

[22] Filed: Sep. 10, 1997

[51] Int. Cl.$^7$ .................................................. E21B 43/25
[52] U.S. Cl. .................... 166/249; 166/177.1; 166/177.2
[58] Field of Search ............................... 166/249, 177.1, 166/177.2, 177.6, 177.5

[56] References Cited

U.S. PATENT DOCUMENTS

| | | | |
|---|---|---|---|
| 3,209,834 | 10/1965 | Essary | 166/177.2 |
| 5,586,602 | 12/1996 | Vagin | 166/249 |

FOREIGN PATENT DOCUMENTS

| | | |
|---|---|---|
| 1710709 | 2/1992 | Russian Federation . |

OTHER PUBLICATIONS

Beresnev et al, Elastic–Wave Stimulation of Oil Production, Etc. Geophysics vol. 59, No. 6, Jun. 1994.

*Primary Examiner*—William Neuder
*Attorney, Agent, or Firm*—Crutsinger & Booth; Gerald G. Crutsinger

[57] ABSTRACT

An apparatus for producing a shock wave in a borehole, such as a well, includes a pumping unit arranged at the wellhead, a tubing string extending downwardly into the production casing of the well, a hollow cylinder assembly connected with the bottom of the tubing string, and a pair of plungers arranged within the cylinder assembly and connected with the pumping unit with sucker rods and a polish rod for compressing liquid contained within the cylinder assembly and discharging the compressed liquid into the production casing, thereby generating a shock wave. The cylinder assembly includes a hollow upper cylinder, a hollow lower cylinder arranged below the upper cylinder, a crossover cylinder arranged between the upper and lower cylinders, and a compression cylinder containing a compression chamber arranged between the crossover cylinder and the upper cylinder. The lower cylinder has a larger inner diameter than the upper cylinder inner diameter, and the lower plunger has a larger diameter than the upper plunger. In addition, the lower cylinder is adapted to receive the lower plunger and the upper cylinder is adapted to receive the upper plunger. When the plungers are displaced upwardly in the cylinder assembly, the lower plunger travels into the compression chamber and the upper plunger travels out of the compression chamber. Due to the lower plunger having a greater diameter than the upper plunger, the volume of the compression chamber is reduced and the liquid contained therein becomes compressed. When the pumping unit reaches the top of its stroke, the lower plunger allows the compressed liquid contained in the compression chamber to be discharged into the well.

16 Claims, 2 Drawing Sheets

DUAL TUBING PUMP FOR STIMULATION OF OIL-BEARING FORMATIONS

BACKGROUND OF THE INVENTION

The present invention relates to a shock wave generating device and, more particularly, to a device for repeatedly generating shock waves in a well hole to increase oil recovery from an oil bearing formation.

BRIEF DESCRIPTION OF THE PRIOR ART

Seismic or elastic wave stimulation is a known technique for enhancing oil recovery from an oil bearing bed as described in "Elastic-Wave Stimulation of Oil Production: A Review of Methods and Results," Geophysics Vol. 59, No. 6 (June 1994).

Various devices for imparting a shock wave to a well are known in the patented prior art. The Russian Federation Patent No. 1,710,709, for example, discloses a method and apparatus in which an anvil plate is arranged at the bottom of the well and a heavy weight in the form of water filled tubing is repeatedly lifted and dropped onto the anvil plate, thereby imparting vibrations to the oil bed. However, the repeated impact of the weight eventually destroys the bottom of the well. The amount of damage can be minimized by limiting the impact force applied to the anvil plate, but this lowers the power of the elastic waves which reduces efficiency. In addition, the efficiency of this method is limited by a low energy transfer coefficient of the potential energy of the weight into the energy of the elastic waves.

The U.S. Pat. No. to Vagin No. 5,586,602 discloses a method and apparatus for increasing the effectiveness of shock wave stimulation of oil-bearing formations which includes a pumping unit arranged at the wellhead, a tubing string which extends downwardly into the production casing of the well, a stuffing box arranged on top of the tubing string, a cylinder connected with the bottom of the tubing string, and a plunger which reciprocates up and down within the tubing string and cylinder. As the plunger moves upwardly, the fluid in the tubing string is compressed. At the top of the pumping unit upstroke, the plunger exits the top of the cylinder so that the fluid in the tubing string is discharged into the production casing, thereby generating a shock wave. Although this method achieves higher efficiency than the method described in the Russian patent No. 1,710,709 discussed above, it is limited in terms of its reliability, effectiveness, and efficiency because (1) a cement/bridge plug must be installed to pressurize the borehole, (2) the pressure on the front of the shock wave must be limited due to the low reliability of the stuffing box undergoing a high periodic pressure, (3) additional surface equipment must be used to compensate for liquid leaking through the stuffing box, casing, cement plug, and other equipment, and (4) it is unable to generate a shock wave near the bottom hole for wells having a depth of greater than 800–1000 feet.

The present invention was developed to overcome these and other drawbacks of the prior devices by providing an improved method and apparatus for producing an elastic shock wave in a borehole which includes pumping means arranged at the wellhead, a tubing string extending downwardly into the production casing of the well, a hollow cylinder assembly connected with the bottom of the tubing string, and a pair of plungers arranged within the cylinder assembly for compressing liquid contained within the cylinder assembly and discharging the compressed liquid into the production casing, thereby (generating a shock wave.

SUMMARY OF THE INVENTION

Accordingly, a primary object of the present invention is to provide an apparatus for producing a shock wave in a borehole, such as a well, which includes a pumping unit arranged at the wellhead, a tubing string extending downwardly into the production casing of the well, a hollow cylinder assembly connected with the bottom of the tubing string, and a pair of plungers arranged within the cylinder assembly and connected with the pumping unit with sucker rods and a polish rod for compressing liquid contained within the cylinder assembly and discharging the compressed liquid into the production casing, thereby generating a shock wave.

The cylinder assembly includes a hollow upper cylinder, a hollow lower cylinder arranged below the upper cylinder, a crossover cylinder arranged between the upper and lower cylinders, and a compression cylinder containing a compression chamber arranged between the crossover cylinder and the upper cylinder. The lower cylinder has a larger inner diameter than the upper cylinder and the lower plunger has a larger diameter than the upper plunger. In addition, the internal bore of the lower cylinder is adapted to receive the lower plunger, and the internal bore of the upper cylinder is adapted to receive the upper plunger. When the plungers are displaced upwardly in the cylinder assembly, the lower plunger travels into the compression chamber and the upper plunger travels out of the compression chamber. Due to the lower plunger having a greater diameter than the upper plunger, the volume of the compression chamber is reduced and the liquid contained therein becomes compressed. When the pumping unit reaches the top of its stroke, the lower plunger allows the compressed liquid contained in the compression chamber to be discharged into the well.

It is another object of the invention to provide an apparatus for producing a shock wave in a borehole in which the lower plunger includes an upper portion having a generally smooth outer perimeter which creates a generally liquid tight interface between the lower plunger and the lower cylinder, and a lower portion containing a plurality of flow channels which allow liquid to flow past the lower plunger into the lower cylinder when the upper portion of the cylinder is displaced beyond the lower cylinder. In addition, the lower plunger includes an internal bore and a ball for selectively allowing the passage of liquid upwardly through the lower plunger into the compression chamber when the lower plunger is displaced downwardly.

It is a further object of the present invention to provide a method of producing a shock wave in a borehole which includes the steps of installing a tubing string and cylinder assembly in the borehole, filling the borehole and cylinder assembly with a liquid, providing a pair of plungers in the cylinder assembly, and displacing the plungers to compress the liquid contained in the cylinder assembly and discharge the liquid into the borehole.

In operation, the apparatus is installed in a borehole so that the hydrostatic fluid level in the well is higher than the top of the upper cylinder. The motion of the pumping unit causes the plungers to move up and down in the upper and lower cylinders. On the upstroke, the liquid in the compression chamber is compressed and at the top of the stroke, the lower plunger is pulled out of the lower cylinder. When the lower plunder exits the lower cylinder, the compressed liquid contained in the compression chamber is released, thereby generating a shock wave which propagates downwardly until it strikes the bottom of the well and propagates farther into the formation. On the downstroke, the lower plunger is reinserted into the lower cylinder while the upper plunger remains inside the upper cylinder, thereby providing the seal needed to compress the liquid in the compression chamber during the upstroke.

BRIEF DESCRIPTION OF THE DRAWINGS

Other objects and advantages of the invention will become apparent from a study of the following specification when viewed in light of the accompanying drawings, in which.

DETAILED DESCRIPTION

Figure 1:
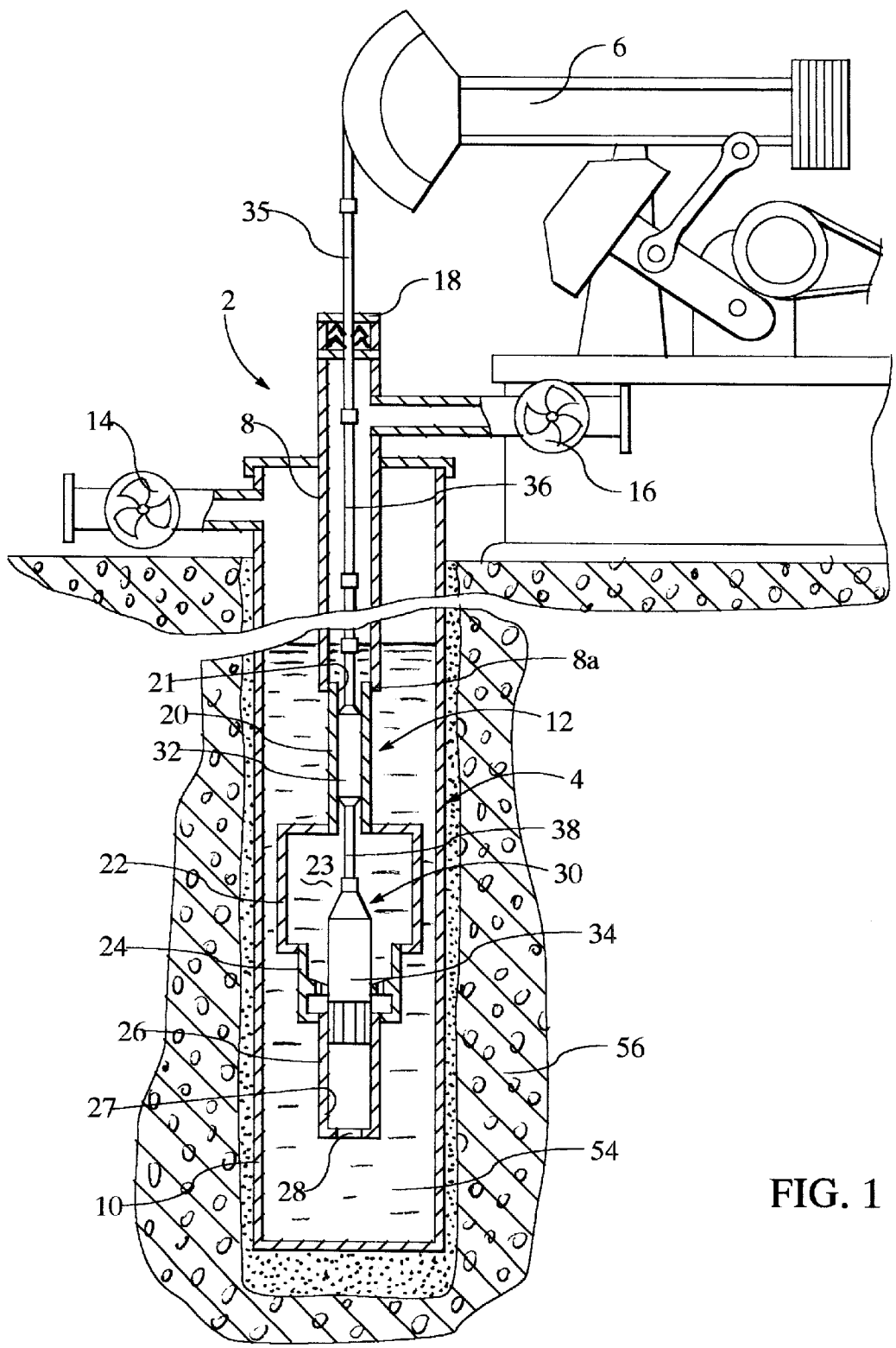
FIG. 1 is a cross-sectional side view of the device according to the invention installed in a well.

Referring first to FIG. 1, there is shown a device 2 for producing a shockwave in a borehole or well 4. The device includes a pumping unit 6 arranged at the wellhead, a tubing string 8 extending downwardly into the production casing of the well, and a cylinder assembly 12 connected with the lower end 8a of the tubing string. A casing valve 14, a tubing valve 16, and a stuffing box 18 are also arranged at the wellhead.

The cylinder assembly 12 includes an upper cylinder 20 connected with the lower end of the tubing string 8a, a compression cylinder 22 connected with the lower end of the upper cylinder 20, a crossover cylinder 24 connected with the bottom of the compression cylinder 22, and a lower cylinder 26 connected with the bottom of the crossover cylinder 24. The upper cylinder contains an internal bore 21, the compression cylinder contains a compression chamber 23, and the lower cylinder contains an internal bore 27, and an opening 28 in its lower end.

A plunger assembly 30 includes an upper plunger 32 adapted to fit within the internal bore 21 of upper cylinder 20, and a lower plunger 34 adapted to fit within the internal bore 27 of lower cylinder 26. For reasons described below, the diameter of the upper plunger 32 is smaller than the diameter of the lower plunger 34. The upper plunger 32 is connected with the pumping unit 6 with a polish rod 35 which extends through the stuffing box 18, and a plurality of sucker rods 36 which extend through the tubing string 8. One or more connection rods 38 connect the upper plunger 32 with the lower plunger 34.

Figure 2:
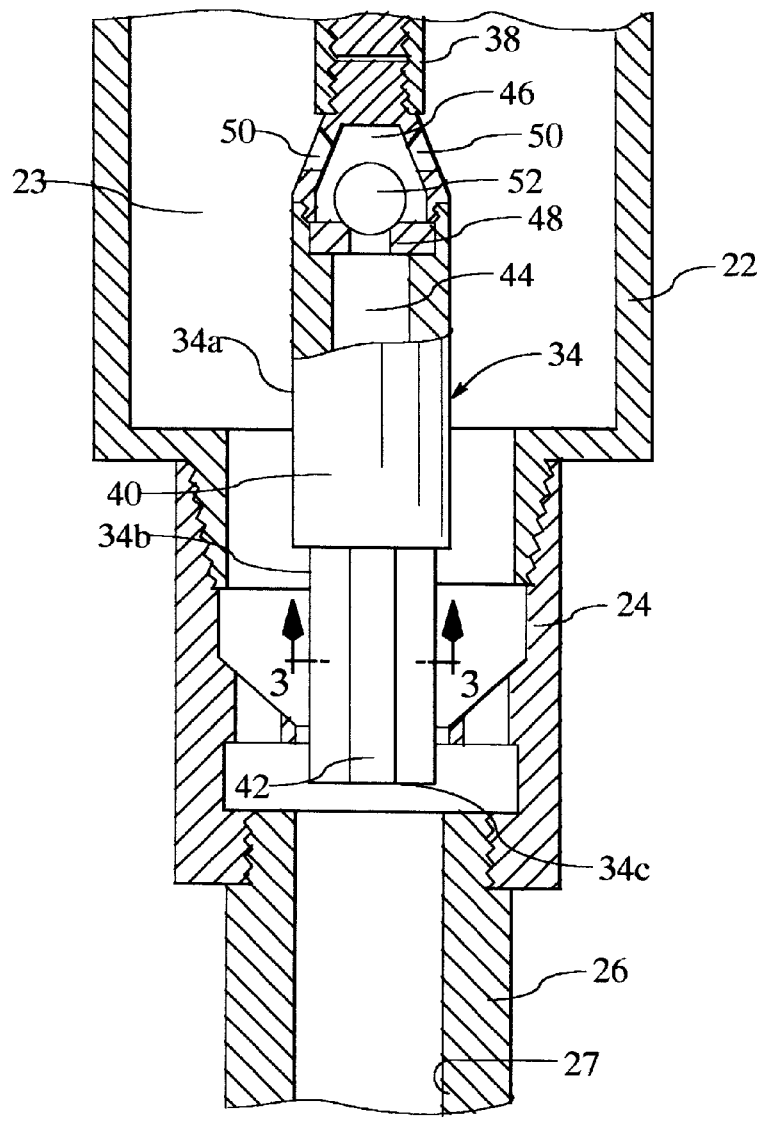
FIG. 2 is a detailed view of the lower plunger in the compression chamber.
Figure 3:
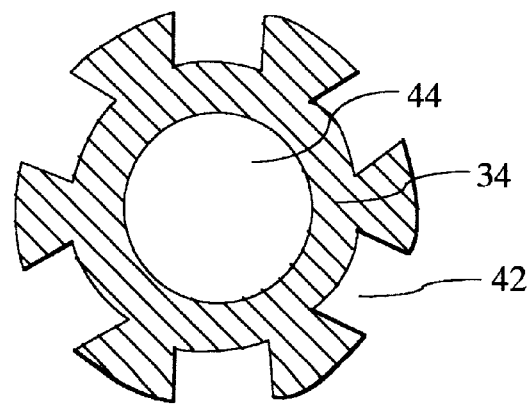
FIG. 3 is a cross-sectional view of the lower portion of the lower plunger.

As shown in FIGS. 2 and 3, the lower plunger 34 includes an upper portion 34a having a smooth outer surface 40 which forms a generally water-tight seal with the internal bore 27 of the lower cylinder 26, and a lower portion 34b which contains a plurality of flow channels 42. A flow-through bore 44 extends longitudinally through the plunger from a ball chamber 46 contained in the upper portion of the plunger to the lower end 34c of the plunger. A seating ring 48 is arranged between the ball chamber 46 and the flow-through bore 44.

The ball chamber 46 includes ports 50 and contains a ball 52 adapted to mate with seating ring 48. When the lower plunger 34 is displaced upwardly during the compression stroke, the ball 52 engages the seating ring 48, thereby preventing the flow of liquid through the flow-through bore 44. When the lower plunger 34 is displaced downwardly, the ball 52 disengages the seating ring 48, thereby allowing liquid to flow upwardly through the flow-through bore 44 into the compression chamber 23.

Operation

To generate a shock wave in the well using the device, the well 4 and cylinder assembly 12 are filled with a suitable liquid 54, such as water. The hydrostatic level of the liquid in the well must be higher than the top of the upper cylinder 20. During the upstroke of the pumping unit 6, the volume in the cylinder assembly between the bottom of the upper plunger 32 and the lower plunger 34 is reduced. Accordingly, the water contained therein is compressed. The volume reduction is due to the fact that the large diameter lower plunger 34 displaces more liquid than the small diameter upper plunger 32 as each moves in tandem upwardly in the cylinder assembly 12. The volume of the compression chamber is defined by the following:

$$V_c = \frac{\pi/4(d_2^2 - d_1^2)L_s - (q_2 - q_1)}{Pb} - \pi/4(d_2^2 - d_r^2)L_s$$

where:

$$q_1 = \frac{\pi d_1 P \delta_1^3}{\mu l_1}$$

$$q_2 = \frac{\pi d_2 P \delta_2^3}{\mu l_2}$$

$q_1$ and $q_2$ are the slippage losses between the plunger and cylinder surfaces for the upper and the lower plungers, respectively, $d_1$ and $d_2$ are the diameters of the upper and lower plungers, respectively;

$d_r$ is the diameter of the connection rod(s) 38;

$L_s$ is the length of the stroke;

$\delta_1$ and $\delta_2$ are the clearances between the inner surface of the cylinder and the outer surface of the plunger for the upper and lower plungers, respectively;

$l_1$ and $l_2$ are the lengths of the upper and lower plungers, respectively;

$\mu$ is the viscosity of the compressed liquid,

P is the pressure on the front of the shock wave; and b is the compressibility coefficient of the liquid.

At the moment the upper portion 34a of the lower plunger 34 exits the lower cylinder 26, the compressed liquid is discharged into the lower cylinder 26 and into the production casing 10, thereby creating a shock wave which impacts the bottom of the well. Part of the shock wave energy is reflected back toward the wellhead while part is transmitted into the surrounding bed or formation 56 to stimulate oil production therein.

The high efficiency of the present invention is due to the high power of the shock wave created. A high power wave can be created because the maximum pressure is not limited by the working pressure of the stuffing box, the "flowing" of the polish rod, or other possible casing leaks. The present invention allows any reasonable maximum pressure on the front of the shock wave to be created as defined by the following equation:

$$N = \frac{\pi d_2^3 P^2}{8 \rho c}$$

where

N is the power of the shock wave;

$d_2$ is the diameter of the lower plunger 34;

P is the maximum pressure of the compressed liquid between the upper 32 and lower 34 plungers;

p is the density of the liquid; and c is the velocity of sound in the liquid.

Thus, if the pressure P is increased two times, the power of the wave is increased four times and the amount of the formation affected by the wave is greatly increased.

Since the present invention does not require that the borehole volume be sealed, the need for a cement plug is eliminated. In addition, the present invention can be arranged in the vicinity of the bottom of the well, thereby reducing energy losses of the shock wave traveling in the casing.

While in accordance with the provisions of the Patent Statutes the preferred forms and embodiments of the invention have been illustrated and described, it will be apparent to those of ordinary skill in the art that various changes and modifications may be made without deviating from the inventive concepts set forth above.

What is claimed is:

1. Apparatus for producing a shock wave in liquid in a borehole, comprising:
   (a) a tubing string extending into the borehole;
   (b) a cylinder assembly connected with the tubing string, said cylinder assembly containing an elongated internal chamber having an upper bore and a lower bore, said upper bore having a cross-sectional area which is less than the cross-sectional area of the lower bore;
   (c) means for positioning said cylinder assembly such that said cylinder assembly is submerged in liquid in the borehole and said internal chamber is filled with liquid;
   (d) a plunger assembly including a seal engaging said upper bore and a lower plunger movably arranged within said lower bore and into said internal chamber for compressing a portion of the liquid contained within said internal chamber and discharging the liquid into the borehole when said plunger moves through said lower bore into said internal chamber; and
   (e) pumping means connected with said plunger assembly for displacing said plunger assembly within said cylinder assembly.

2. Apparatus for producing a shock wave in a borehole, comprising:
   (a) a tubing string extending downwardly into the borehole:
   (b) a cylinder assembly connected with the tubing string, said cylinder assembly containing an elongated internal chambers;
   (c) means for filling the borehole and said internal chamber with a liquid;
   (d) a plunger assembly including upper and lower plungers movably arranged within said internal chamber for compressing a portion of the liquid contained within said internal chamber and discharging the liquid into the borehole; and
   (e) pumping means connected with said plunger assembly for displacing said plunger assembly within said cylinder assembly, wherein said cylinder assembly includes:
      (i) an upper cylinder containing an internal bore adapted to receive said upper plunger;
      (ii) a lower cylinder arranged below said upper cylinder, said lower cylinder containing an internal bore adapted to receive said lower plunger, said lower cylinder internal bore having a cross-sectional area greater than said upper cylinder internal bore cross-sectional area, said lower cylinder further having a lower end containing and opening;
      (iii) a compression cylinder defining a compression chamber arranged between said upper and said lower cylinders; and
      (iv) a crossover cylinder arranged between said lower cylinder and said compression cylinder.

3. Apparatus as defined in claim 2, wherein said lower plunger has a cross-sectional area greater than said upper plunger cross-sectional area.

4. Apparatus as defined in claim 3, wherein said lower plunger includes an upper portion having a generally smooth outer perimeter, and a lower portion containing a plurality of flow channels.

5. Apparatus as defined in claim 4, wherein said lower plunger is movable between a first position wherein said lower plunger upper portion is contained at least partially within said lower cylinder, and a second position wherein said lower plunger lower portion is contained at least partially within said crossover cylinder.

6. Apparatus as defined in claim 5, wherein said pumping means includes a pumping unit connected with said plunger assembly for reciprocally displacing said plunger assembly between said first and second positions.

7. Apparatus as defined in claim 6, wherein said upper plunger is rigidly connected with said lower plunger with a connection rod.

8. Apparatus as defined in claim 7, wherein said lower plunger includes flow-through means for allowing liquid to flow upwardly through said lower plunger into said compression chamber when said lower plunger is displaced downwardly in said cylinder assembly.

9. Apparatus as defined in claim 8, wherein said flow-through means includes an internal bore extending through said lower plunger, and a ball movably contained within said plunger adjacent said bore, whereby when said lower plunger is displaced upwardly in said cylinder assembly, said ball engages said bore to prevent the flow of liquid through said lower plunger, and when said lower plunger is displaced downwardly in said cylinder assembly, said ball disengages said bore, thereby allowing liquid to flow through said lower plunger into said compression chamber.

10. A method for producing seismic waves in an oil-bearing formation, comprising the steps of:

positioning a cylinder assembly having a pressure chamber and upper and lower internal bores communicating with said chamber in a well such that the cylinder assembly is submerged in liquid in the well;

positioning a plunger assembly such that a rod on the plunger assembly extends through and seals the upper bore and a plunger reciprocates in said lower bore and is drawn into said chamber; and reciprocating the rod and plunger such that movement of the rod and plunger compresses liquid in the chamber and releases compressed liquid through the lower bore into the well when the plunger moves from the lower bore into the chamber.

11. A method according to claim 10, wherein the pressure chamber has a cross-sectional area which is greater than the cross-sectional area of the plunger.

12. A method according to claim 10, wherein the cylinder assembly is positioned near the bottom of the well.

13. A method according to claim 10, wherein the well is partially filled with liquid.

14. A method of producing a shock wave comprising the steps of:

positioning a device having a chamber and an internal bore in liquid such that the device is submerged in the liquid, said internal bore and said chamber having cross-sectional areas, said cross-sectional area of the internal bore being less than the cross-sectional area of the chamber;

delivering liquid into the chamber and the bore;

moving a piston on a piston assembly through the bore to pressurize liquid in the chamber; and moving the piston out of the bore into the chamber for releasing pressurized liquid through the bore into the liquid in which the device is submerged, said piston assembly including a rod and a piston, said rod extending through a second bore in sealing relation with said second bore.

15. The method of claim 14, wherein the bore is submerged in liquid in a well.

16. A method according to claim 14, said rod being a sucker rod which extends through a tubing string in a well.

* * * * *

UNITED STATES PATENT AND TRADEMARK OFFICE
CERTIFICATE OF CORRECTION

PATENT NO. : 6,015,010

DATED : January 18, 2000

INVENTOR(S) : Sergey A. Kostrov

It is certified that error appears in the above-identified patent and that said Letters Patent is hereby corrected as shown below:

Column 1, line 67, before "generating" delete "(";

Column 3, line 22, after "production casing" insert --10--;

Column 4, after line 60, the equation should read:

$$N = \frac{\pi d_2^2 P^2}{8pc}$$

Column 6, line 4, "and" should be --an--.

Signed and Sealed this

Seventh Day of November, 2000

Attest:

Q. TODD DICKINSON

*Attesting Officer*     *Director of Patents and Trademarks*